United States Patent
Moseley

(10) Patent No.: US 7,434,061 B2
(45) Date of Patent: Oct. 7, 2008

(54) METHOD AND SYSTEM FOR GENERATING PASSWORDS

(76) Inventor: Brett E. Moseley, 5903 Meadow Rose, Elkridge, MD (US) 21075

( * ) Notice: Subject to any disclaimer, the term of this patent is extended or adjusted under 35 U.S.C. 154(b) by 642 days.

(21) Appl. No.: 10/910,165

(22) Filed: Aug. 2, 2004

(65) Prior Publication Data

US 2006/0026439 A1   Feb. 2, 2006

(51) Int. Cl.
*H04L 9/00* (2006.01)
(52) U.S. Cl. .................................... 713/184
(58) Field of Classification Search ............... 713/184
See application file for complete search history.

(56) References Cited

U.S. PATENT DOCUMENTS

| | | | | |
|---|---|---|---|---|
| 6,141,760 | A * | 10/2000 | Abadi et al. | 726/14 |
| 6,145,003 | A * | 11/2000 | Sanu et al. | 709/225 |
| 7,103,912 | B2 * | 9/2006 | Xia et al. | 726/8 |
| 2003/0041251 | A1 * | 2/2003 | Kumhyr | 713/184 |
| 2003/0131266 | A1 * | 7/2003 | Best et al. | 713/202 |
| 2003/0163738 | A1 * | 8/2003 | Couillard | 713/202 |
| 2004/0168068 | A1 * | 8/2004 | Goal et al. | 713/184 |
| 2005/0120233 | A1 * | 6/2005 | Halcrow et al. | 713/193 |

\* cited by examiner

*Primary Examiner*—Nasser Moazzami
*Assistant Examiner*—Michael S McNally
(74) *Attorney, Agent, or Firm*—Ober/Kaler; Royal W. Craig

(57) ABSTRACT

An improved method and system of generating passwords wherein Internet search engines are provided a random query and the search results are used to generate a mnemonic password. The password is memorable, yet non-user generated, and the use of search engines allows for a very large set of potential results. The password is more secure than most conventional passwords because it is memorable and not likely to be written down and because it is random. A large set of potential results ensures that the password is unlikely to be determined by a third party. The present method can be used with any device that has access to the Internet. The system can be customized to limit results to a specific language, filter offensive content, and incorporate encryption to limit eavesdropping.

12 Claims, 2 Drawing Sheets

METHOD AND SYSTEM FOR GENERATING PASSWORDS

BACKGROUND OF THE INVENTION

1. Field of the Invention

The present invention relates to the automatic generation of passwords, and more specifically, to an improved method and system for generating a password from a unique mnemonic based on the results of an Internet search.

2. Description of the Background

Today, many products, devices and/or systems rely on passwords to serve as an access control mechanism. Internet sites, telephone systems, and building security systems are just a few examples of devices/systems that require a password for access. One of the security challenges related to these access control mechanisms (collectively referred to as passwords) is the generation of a secure password. The two most common mechanisms for generating passwords are either to automatically generate a random password or to create a one-time password that the user is then asked to modify upon initial login. A randomly generated password, while initially more secure than a user-selected password, is difficult for a user to recall. Consequently, a user often writes the password down or stores it in a computer file so it is available when needed. The recorded password then becomes susceptible to being exposed to a third party. Likewise, a one-time randomly generated password is likely to be replaced by a user-selected password that is cryptographically weak, easily determined, and/or non-unique and shared among multiple systems. Indeed, many individuals use the same password for all or most of their access requirements. The present invention provides more security than prior methods for generating passwords because it generates a memorable password, while ensuring randomness and uniqueness.

Passwords are more memorable if they can be linked to a phrase and committed to memory as a mnemonic. For example, the phrase, "Itsy-bitsy spider crawled up the water spout" can be used to generate the mnemonic password, "IBSCUTWS". For a phrase to be memorable, it must comply with generally understood and accepted rules of grammar. To ensure that the phrase complies with generally understood rules of grammar, the phrase must be selected from a pre-existing library of grammatically correct phrases.

In the past, various security devices have used small dictionaries to create random passwords. For example, the Diceware™ method picks a pass phrase using dice to select words at random from a preset dictionary list of several thousand terms. Each word in the library is assigned a five digit number comprised of digits between zero and seven. The results of five dice rolls determine the word selected from the library. The user may choose to include any number of words in the pass phrase. The steps of rolling the die five times are repeated as many times as the number of words the user wishes to include in their pass phrase. To illustrate the Diceware method, a user may decide they want a six word pass phrase. They roll a die five times and the outcome of the five dice rolls is a five digit number, e.g., 14562, where "1" is the result of the first roll, "4" is the result of the second roll, etc. This action is repeated six times, each set of five dice rolls corresponding to a word from the library, which then becomes the user's pass phrase, such as "emile grade finale cooke snip nice". The difficulty with the Diceware algorithm is that the resulting password is not memorable because it is a random grouping of words and not grammatically correct.

U.S. Pat. No. 5,812,764 to Heinz, Sr. discloses a system and method of generating passwords that is shared between two or more devices. While the '764 patent generates passwords between two or more devices, the passwords are cryptographically secure and therefore not easily memorable.

Selecting a password from a library of pre-existing known phrases is a useful mechanism to generate a grammatically correct phrase. However, the library must be extensive enough to minimize the likelihood of two phrases being the same. For example, Leonard Tolstoy's "War and Peace" contains approximately 75,000 sentences. If "War and Peace" is used as the pre-existing library, a duplicate password would appear on average after 37,500 generations. For purposes of comparison, in this example, a four-character password has 457,000 combinations ($26^4$).

It would be greatly advantageous to provide a method and system for generating a password from a unique mnemonic based on the results of an Internet search. Using a popular search engine as a reference, the Internet has over 4,000,000,000 unique pages. Assuming each page has, on average, 20 sentences, the Internet has over 80,000,000,000 available sentences from which to derive mnemonics. Moreover, due to the dynamic nature of the Internet, the search results can be expected to change over time. Thus, if a search query is sent to a search engine and the same search query is repeated at a later time, the results will likely be different. For purposes of comparison, a seven character password has 8,000,000,000 combinations ($26^7$), which is far greater than the previous "War and Peace" example. This form of password generation system could easily be incorporated into any device that has access to the Internet.

SUMMARY OF THE INVENTION

It is therefore an object of the present invention to provide an improved method and system for generating passwords.

It is a further object of the present invention to provide an improved method and system for generating passwords that generates a unique password It is a still further object of the present invention to provide an improved method and system for generating passwords that generates a more secure password.

It is yet another object of the invention to provide an improved method and system for generating passwords that generates a memorable password.

According to the present invention, these and other objects are accomplished by providing a password generation system that presents input values to an Internet search engine, randomly selects the nth result, builds a mnemonic password from the first letter of each word in the result, and presents the result and password to the user. To illustrate the system of the present invention, assume that the input values of "North" and "Radio" are sent to a search engine. Using a popular search engine, approximately 7,170,000 results are returned from the search. Randomly selecting the $71^{st}$ result, the sentence, "An archive of the original Pop Pirate Radio Ship", is selected. The resulting password would be the mnemonic "AAOTOPPRS", derived from the first letter of each word in the sentence. Assuming that the password is acceptable based on a predefined set of rules, the password is presented to the user, along with the search result sentence. The password is memorable because the sentence is memorable. The password is more secure than prior password generation systems because it is unique, yet memorable and therefore less likely to be written down.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The password generation method and system according to the present invention may be practiced using any well-known combination of hardware, software, and/or firmware capable of generating random values, communicating to the Internet, and evaluating the results.

Figure 1:
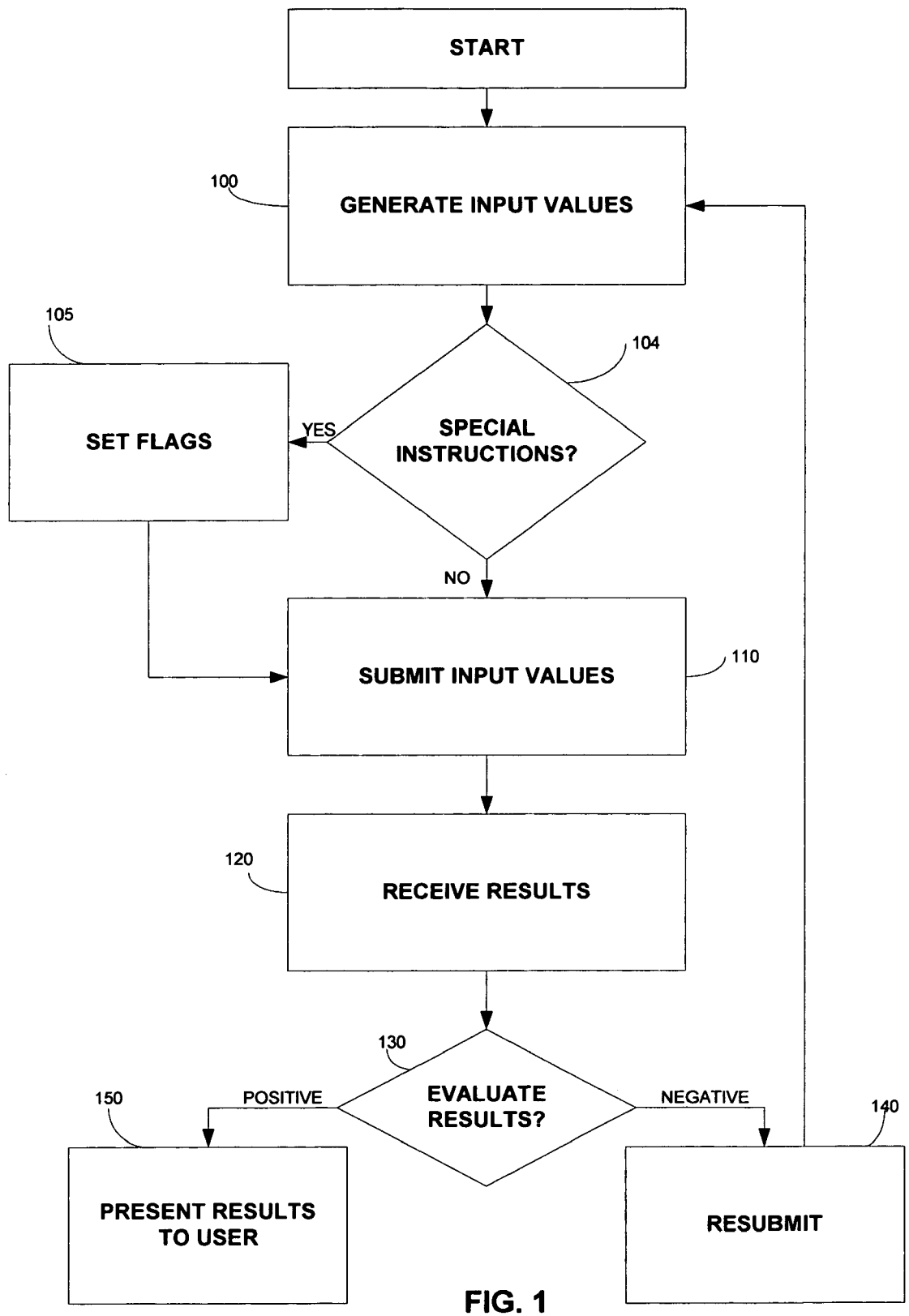
FIG. 1 is a detailed flow diagram of the improved method and system for generating passwords via Internet search engines.

FIG. 1 is a detailed flow diagram of the improved method and system for generating passwords via Internet search engines. At Step 100, the random values are generated. In the preferred embodiment, the random values are pairs of English words randomly selected from a conventional dictionary of, for example, 100,000 words. However, this specific setting can be adjusted in accordance with the needs of any specific implementation. In an alternative embodiment, the user supplies the input values. To illustrate the system of the present invention, we assume that the input values of "North" and "Radio" are randomly selected.

At 104, a determination is made as to whether special instructions must be considered such as: return results in English language only, or: eliminate offensive language from the result. If yes, special instruction flags are set at Step 105 for transmission to the search engine. These specific settings and flags can be adjusted in accordance with the needs of any specific implementation and may be defined at either the device/system level (by an administrator) or at the user level. The nature and values of the flags are dependent on preference as well as the specific search engine to be used. Any combination of flags and associated values can be adjusted.

At Step 110, the selected input values (and any special instruction flags) are submitted to an Internet search engine. In our example, the input values of "North" and "Radio" are sent to the search engine.

At Step 120, the results are returned by the search engine and the system randomly selects the nth result (one of the returned URL addresses). The selected result value may correspond to any one of the resulting URLs that was returned. Using an existing popular search engine, approximately 7,170,000 results are returned from the search of input values "North" and "Radio". The system may randomly select the 71$^{st}$ resulting URL, which the search engine abstracts by the sentence, "An archive of the original Pop Pirate Radio Ship".

At Step 130, a mnemonic is built from the selected result and the search engine abstract that was returned. Given our example, the resulting password would be the mnemonic "AAOTOPPRS", derived from the first letter of each word in the sentence "An archive of the original Pop Pirate Radio Ship". This constructed password mnemonic is evaluated for validity; e.g., to ensure that it is of minimum character length, that all of the characters are not the same, etc. If the generated password fails the validity evaluation, at Step 140, the system may resubmit the results to the search engine, or re-perform the process with new values and return to Step 100. The resubmission may be performed for a set number or times or a random number of times.

At Step 150, the user is presented the results in the form of a mnemonic password ("AAOTOPPRS"), as well as the corresponding search result phrase "An archive of the original Pop Pirate Radio Ship" which helps to engrain the mnemonic password in long term memory.

Figure 2:
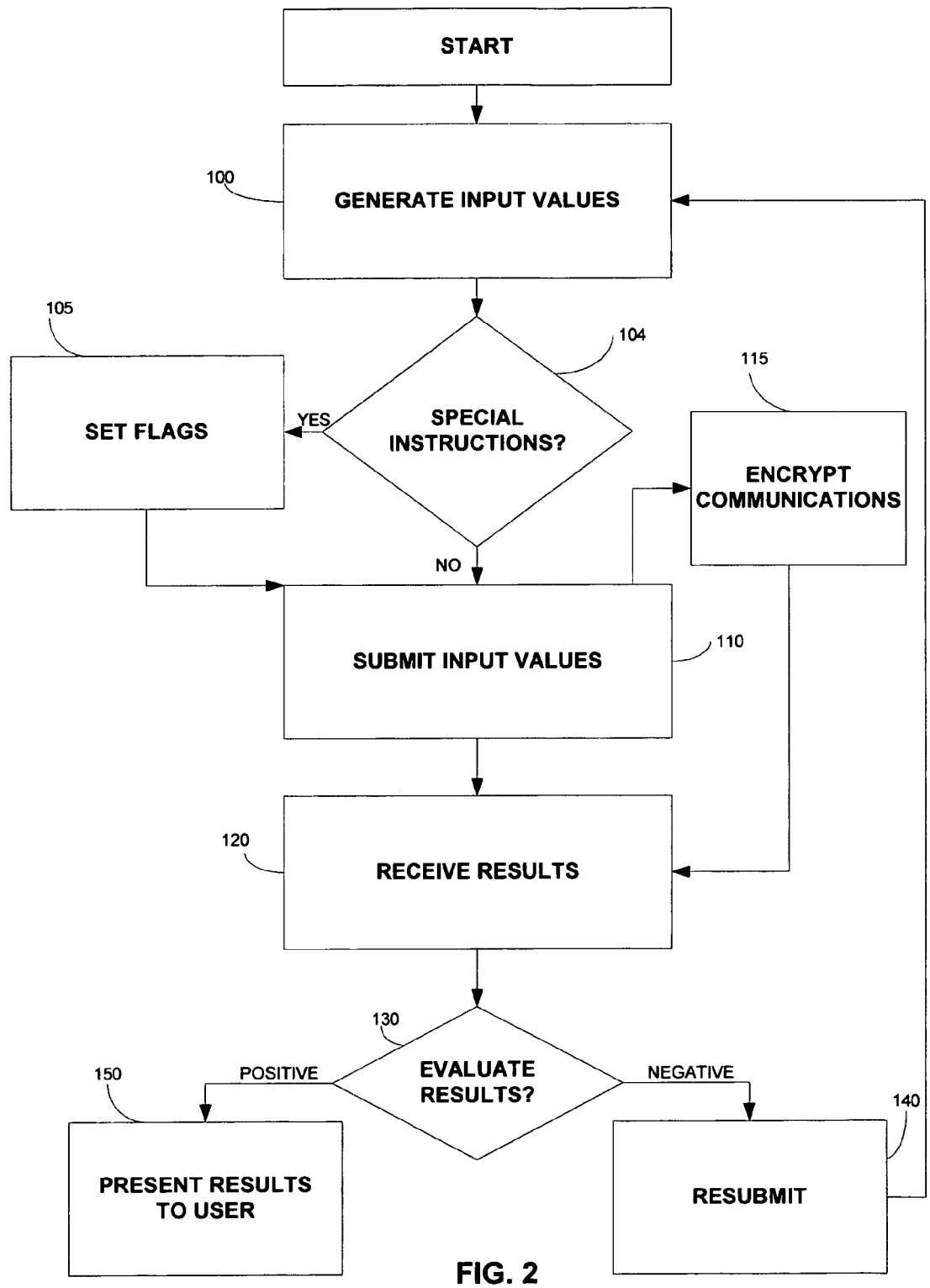
FIG. 2 is a detailed flow diagram of another embodiment of the improved method and system for generating passwords via Internet search engines, using encryption.

FIG. 2 is a detailed flow diagram of a slightly modified embodiment of the improved method and system for generating passwords via Internet search engines, which additionally using encryption. The Steps in FIG. 2 are the same as FIG. 1 with the addition of Step 115 for encryption. This system can be made more secure through the use of encryption between the device requesting the password and the search engine, and so at Step 115 all transmissions between the present system and the search engine are encrypted for enhanced security. Any conventional encryption standards and software may be used here, including PGP, SSL, etc.

The foregoing system and method of password generation, using an existing Internet search engine, randomly selecting the nth result, building a mnemonic password from the first letter of each word in the result, and presenting the result and password to the user, yields a much more unique, secure and memorable password, which is less likely to be written down and consequently obtained by a third party.

Having now fully set forth the preferred embodiments and certain modifications of the concept underlying the present invention, various other embodiments as well as certain variations and modifications thereto may obviously occur to those skilled in the art upon becoming familiar with the underlying concept.

I claim:

1. A method of generating a password comprising the steps of:
    creating a random set of input values comprising at least two English words;
    communicating said input values to an internet search engine;
    receiving a listing of search results returned by said internet search engine based on its search of said input values;
    evaluating the listing of search results;
    randomly selecting an nth result from said listing of search results including a URL and abstract for said nth result;
    constructing a mnemonic password from the URL or abstract of said randomly selected nth result;
    evaluating the password generation results; and
    presenting said nth result and said mnemonic password to a user.

2. The method of generating a password according to claim 1, wherein said step of evaluating the password listing of search results further comprises the step of using a predefined set of rules to ensure password validity and complexity.

3. The method of generating a password according to claim 1, wherein said step of communicating the input values further comprises the step of sending special instruction flags to filter the results.

4. The method of generating a password according to claim 1, wherein said step of evaluating the listing of results further comprises the step of determining the need to generate input values and repeat prior steps until a satisfactory password is generated.

5. The method of generating a password according to claim 1, further comprising the step of repeating the process over multiple iterations.

6. The method of generating a password according to claim 1, further comprising the step of substituting or adding characters and/or symbols to said password.

7. A method of generating a password comprising the steps of:
creating a random set of input values comprising at least two English words;
establishing an encrypted communication channel to prevent eavesdropping;
communicating said input values to a search engine over said encrypted communication channel;
receiving a listing of results returned by said internet search engine based on its search of said input values;
evaluating the listing of search results;
randomly selecting an nth result from said listing of search results including a UPL and abstract for said nth result;
constructing a mnemonic password from the URL or abstract of said randomly selected nth result;
evaluating the password generation results; and
presenting said nth result and said mnemonic password to a user.

8. The method of generating a password according to claim 7, wherein said step of evaluating the listing of results further comprises the step of using a predefined set of rules to ensure password validity and complexity.

9. The method of generating a password according to claim 7, wherein said step of communicating the input values further comprises the step of sending special instruction flags to filter the results.

10. The method of generating a password according to claim 7, wherein said step of evaluating the listing of results further comprises the step of determining the need to generate input values and repeat prior steps until a satisfactory password is generated.

11. The method of generating a password according to claim 7, further comprising the step of repeating the process over multiple iterations.

12. The method of generating a password according to claim 7, further comprising the step of substituting or adding characters and/or symbols to said password.

* * * * *